US012645052B2

(12) United States Patent
Krishnamurthy et al.

(10) Patent No.: US 12,645,052 B2
(45) Date of Patent: Jun. 2, 2026

(54) METHOD FOR TUNING AN IMAGING ASSEMBLY VIA A FOCUS TRIGGERING MARKER

(71) Applicant: ZEBRA TECHNOLOGIES CORPORATION, Lincolnshire, IL (US)

(72) Inventors: Adithya H. Krishnamurthy, Plainview, NY (US); Thomas Conticello, Saint James, NY (US); Thomas Fitzgerald, Coventry, CT (US)

( * ) Notice: Subject to any disclaimer, the term of this patent is extended or adjusted under 35 U.S.C. 154(b) by 0 days.

(21) Appl. No.: 18/607,323

(22) Filed: Mar. 15, 2024

(65) Prior Publication Data

US 2025/0291152 A1    Sep. 18, 2025

(51) Int. Cl.
| | |
|---|---|
| *G02B 7/36* | (2021.01) |
| *H04N 23/61* | (2023.01) |
| *H04N 23/667* | (2023.01) |
| *H04N 23/67* | (2023.01) |

(52) U.S. Cl.
CPC .............. *G02B 7/36* (2013.01); *H04N 23/61* (2023.01); *H04N 23/667* (2023.01); *H04N 23/67* (2023.01)

(58) Field of Classification Search
CPC ........ G02B 7/36; H04N 23/61; H04N 23/667; H04N 23/67
See application file for complete search history.

(56) References Cited

U.S. PATENT DOCUMENTS

| | | | |
|---|---|---|---|
| 6,344,930 | B1 | 2/2002 | Kaneko et al. |
| 11,108,946 | B1 * | 8/2021 | Gurevich ........... G06K 7/10811 |
| 2007/0181685 | A1 | 8/2007 | Zhu et al. |
| 2015/0130987 | A1 * | 5/2015 | Nakagawa ........... H04N 23/663 |
| | | | 348/349 |
| 2019/0073503 | A1 | 3/2019 | Canini et al. |
| 2019/0104295 | A1 * | 4/2019 | Wendel .............. G01B 11/2504 |
| 2020/0192006 | A1 | 6/2020 | Muller et al. |
| 2022/0005224 | A1 * | 1/2022 | Hillman ................... G06T 7/80 |
| 2023/0385576 | A1 | 11/2023 | Gurevich et al. |

OTHER PUBLICATIONS

International Search Report and Written Opinion for application No. PCT/US2025/019200 mailed on May 21, 2025.

* cited by examiner

*Primary Examiner* — Timothy J Henn

(57) ABSTRACT

A system and methods for performing focus tuning of an imaging system. The method includes an image sensor capturing a first image of a focus triggering marker. A processor identifies the focus triggering marker in the first image and responsive to identifying the focus triggering marker the system enters a configuration mode and provides a time delay. After passage of the time delay, the system executes a focusing operation to focus the imaging assembly including determining a focus value based on one or more images captured in the configuration and after the time delay. A controller sets a focal distance of a tunable optical element according to the determined focus value. The imaging sensor then captures one or more images with the focal distance of the tunable optical element set to the determined focus value.

18 Claims, 6 Drawing Sheets

500

502 — Capture Image Of Focus Triggering Marker

504 — Identify Focus Triggering Marker

506 — Enter Configuration Mode

508 — Provide Time Delay

510 — Execute Focus Tuning Operation And Determine Tuned Focus Value

512 — Store Focus Value In Memory

514 — Set Focal Distance To Tuned Focus Value

516 — Capture Images At Set Focus Value

METHOD FOR TUNING AN IMAGING ASSEMBLY VIA A FOCUS TRIGGERING MARKER

BACKGROUND

Over the years, industrial automation has come to rely heavily on machine vision components capable of assisting operators in a wide variety of tasks. In some implementations, machine vision components, like cameras, are utilized to track objects passing objects, like those which move on conveyor belts past stationary cameras. Often these cameras, along with the backend software, are used to capture a variety of parameters associated with the passing items. To do this, the software is configured with a job which includes a series of tools that are executing during each job execution. Subsequently, as items (e.g., boxes) pass within the field of view (FOV) of the camera, a job is executed for each such item.

Typical machine vision systems and barcode readers, such as handheld barcode readers, point of sale scanners, and direct part marking scanners, require high quality, low-blur images to perform desired machine vision operations and to decode barcodes found in images. Therefore, the focus calibration of scanners and machine vision systems is integral for proper, and efficient, operation. With industrial fixed scanning and machine vision cameras, a critical aspect for customers is that the cameras begin and stay in focus in order to perform the precise measurements and decoding expected. However, after setting an initial focus, over time, the focus of the system can drift due to temperature, aging, and other factors causing errors in the data presented to a user or customer. Additionally, due to variations between lenses, lens settings between cameras can be different, making the ability to use the same configuration across cameras not viable.

Typically, focus tuning or alignment is performed manually using either a graphical user interface (GUI) or by hand using optical tuning tools to adjust optical mounts. The focus tuning process can be very slow and cumbersome as it requires a user to look at captured images and determine, in real time, an ideal focus from the captured images. The user must both be observing images and physically adjusting the focus at the same time which is often inconvenient for many barcode reader systems. Further, manual focus tuning is error prone as it relies on the subjective nature of a person to determine when they believe an image is the sharpest.

As such, it could be beneficial for a machine vision system to implement a method for performing focus tuning that does not require manual tuning and subjective evaluation of a person or operator.

SUMMARY

In an embodiment, the present invention is a method for setting a focus parameter of a variable focus imaging assembly. The method includes capturing, by an imaging sensor of the variable focusing imaging assembly, a first image of a focus triggering marker positioned at a first distance within a field of view of the imaging sensor; identifying, by a processor of the variable focusing imaging assembly, the focus triggering marker in the first image; responsive to identifying the focus triggering marker in the first image, entering the variable focusing imaging assembly into the configuration mode and providing a time delay; executing, subsequent to the passing of the time delay, a focusing operation to focus the imaging assembly including determining a focus value based on one or more images captured in the configuration mode and after the time delay; setting, via a controller configured to control a focal distance of a tunable optical element of the imaging assembly, the focal distance of the tunable optical element according to the focus value; and capturing, by the imaging sensor, one or more images with the focal distance of the tunable optical element set to the focus value.

In a variation of the current embodiment, determining the focus value based on one or more images captured in the configuration mode and after the time delay includes capturing, by the imaging sensor, an image of a target object within the field of view of the imaging sensor; and determining, by the processor, the focus value from one or more features associated with the target object of the second image.

In continued variants of the current embodiment, the variable focus imaging assembly has a substantially fixed distance between the imaging assembly and an imaging surface. In more variations of the current embodiment, the time delay is a fixed time delay.

In yet more variations of the current embodiment, the method further includes detecting motion in the field of view of the imaging sensor, and subsequently determining that there is no more motion in the field of view of the imaging sensor before passing the time delay.

In even more variations of the current embodiment, the method further includes detecting motion in the field of view of the imaging sensor and extending the time delay until motion is no longer detected in the field of view of the imaging sensor or until a timeout point is reached.

In another embodiment, the present invention is a method for setting a focus parameter of a variable focus imaging assembly. The method includes capturing, by an imaging sensor of the variable focus assembly, a first image of a focus triggering marker positioned at a first distance within a field of view of the imaging sensor; identifying, by a processor of the variable focusing imaging assembly, the focus triggering marker in the first image; responsive to identifying the focus triggering marker in the first image, entering the variable focusing imaging assembly into a configuration mode;

monitoring, by the imaging assembly and after entering the configuration mode, the field of view to identify a removal of the focus triggering marker from the field of view of the imaging sensor; determining, by a processor, that the focus triggering marker has been removed from the field of view of the imaging sensor; executing, subsequent to removal of the focus triggering marker, a focusing operation to focus the imaging assembly including determining a focus value based on one or more images captured in the configuration mode and after the focus triggering marker has been removed from the field of view of the imaging sensor; setting, via a controller configured to control a focal distance of a tunable optical element of the imaging assembly, the focal distance of the tunable optical element according to the focus value; and capturing, by the imaging sensor, one or more images with the focal distance of the tunable optical element set to the focus value.

In variations of the current embodiment, the method further includes providing a time delay after determining that the focus triggering marker has been removed from the field of view.

In more variations of the current embodiment, the time delay is a fixed time delay.

In continued variations of the current embodiment, the method further includes detecting motion in the field of view of the imaging sensor, and wherein the time delay is dependent on detecting the motion in the field of view of the imaging sensor.

In yet more variations of the current embodiment, the method further includes locking, via the, the focal distance of the variable focus imaging assembly based on the focus value.

In a third embodiment, the present invention is a focus parameter tuning variable focus imaging system. The system includes a tunable optical element; a controller in communication with the tunable optical element, the controller configured to control a focal distance of the tunable optical element; an imaging sensor configured to capture images of a field of view of the imaging sensor; and a processor and computer-readable media storage having machine readable instructions stored thereon. When the machine readable instructions are executed, the machine readable instructions cause the imaging system to: (i) capture, by the imaging sensor, a first image of a focus triggering marker positioned at a first distance within a field of view of the imaging sensor; (ii) identify, by the processor, the focus triggering marker in the first image; (iii) enter, upon identification of the focus triggering element, the variable focusing imaging assembly into a configuration mode and providing a time delay; (iv) execute, subsequent to the passing of the time delay, a focusing operation to focus the imaging assembly including determining a focus value based on one or more images captured in the configuration mode and after the time delay; (v) set, via the controller, the focal distance of the tunable optical element according to the focus value; and (vi) capture, by the imaging sensor, one or more images with the focal distance of the tunable optical element set to the focus value.

In variations of the current embodiment, to determine the focus value based on one or more images captured in the configuration mode and after the time delay, the machine readable instructions cause the system to (i) capture, by the imaging sensor, an image of a target object within the field of view of the imaging sensor; and (ii) determine, by the processor, the focus value from one or more features associated with the target object of the second image.

In more variations of the current embodiment, the machine readable instructions further cause the system to detect motion in the field of view of the imaging sensor, and subsequently determine that there is no more motion in the field of view of the imaging sensor before passing the time delay.

In continue variations of the current embodiment, the machine readable instructions further cause the system to detect motion in the field of view of the imaging sensor and extend the time delay until motion is no longer detected in the field of view of the imaging sensor or until a timeout point is reached.

In a fourth embodiment, the present invention is a focus parameter tuning variable focus imaging system. The system including a tunable optical element; a controller in communication with the tunable optical element, the controller configured to control a focus of the tunable optical element; an imaging sensor configured to capture images of a field of view of the imaging sensor; and a processor and computer-readable media storage having machine readable instructions stored thereon. When executed, the machine readable instructions cause the imaging system to: (i) capture, by the imaging sensor, a first image of a focus triggering marker positioned at a first distance within a field of view of the imaging sensor; (ii) identify, by the processor, the focus triggering marker in the first image; (iii) enter, upon identification of the focus triggering marker, the variable focusing imaging assembly into a configuration mode; (iv) monitor, by the imaging assembly and after entering the configuration mode, the field of view to identify a removal of the focus triggering marker from the field of view of the imaging sensor; (v) determine, by the processor, that the focus triggering marker has been removed from the field of view of the imaging sensor; (vi) execute, subsequent to removal of the focus triggering marker, a focusing operation to focus the imaging assembly including determining a focus value based on one or more images captured in the configuration mode and after the focus triggering marker has been removed from the field of view of the imaging sensor; (vii) set, via the controller, the focal distance of the tunable optical element according to the focus value; and (viii) capture, by the imaging sensor, one or more images with the focal distance of the tunable optical element set to the focus value.

In variations of the current embodiment, the machine readable instructions further cause the system to provide a time delay after determining that the focus triggering marker has been removed from the field of view.

In more variations of the current embodiment, the machine readable instructions further cause the system to detect motion in the field of view of the imaging sensor, and wherein the time delay is dependent on detecting the motion in the field of view of the imaging sensor.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
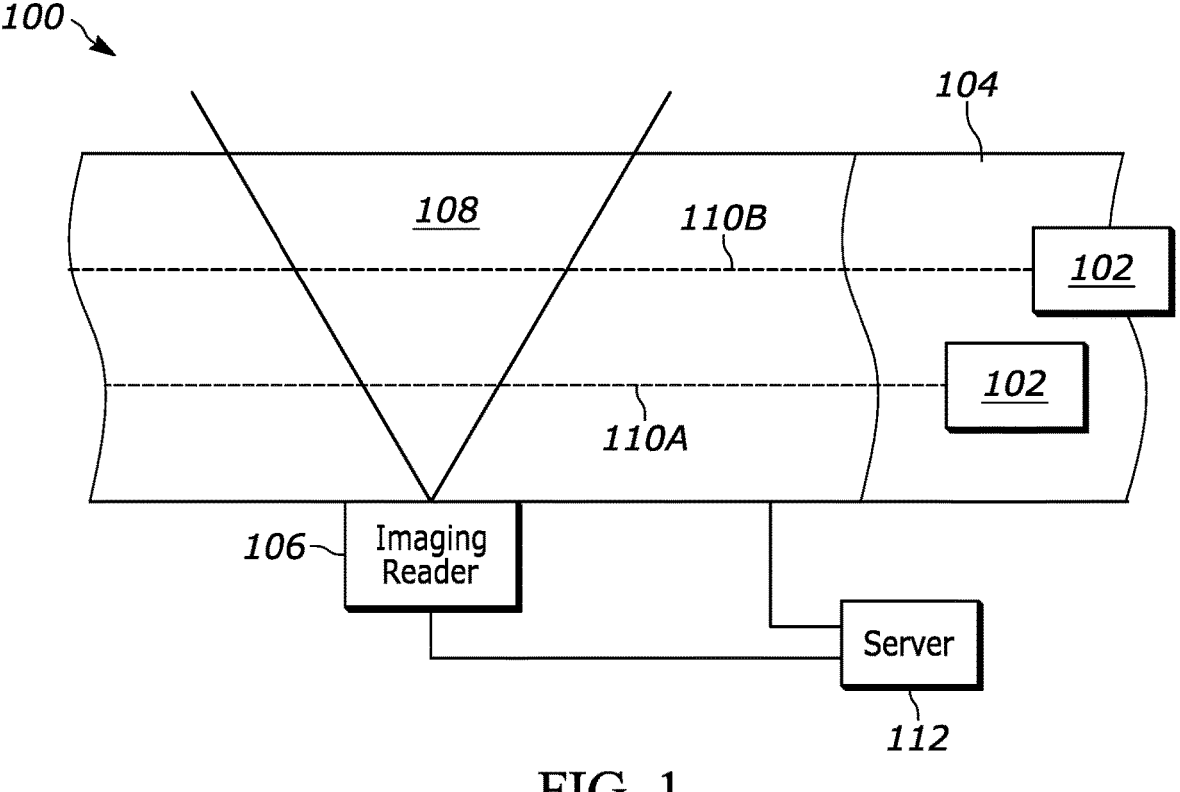
FIG. 1 is an example system for performing focus tuning of a fixed industrial scanner system, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Electrically controlled variable focus (VF) lenses are convenient, low-power solutions for fast auto-focus (AF) on objects of interests (OOI) in machine vision and bar-code applications. However, when location of objects of interest in the field of view varies (e.g., parts moving on conveyor, a person moving an object across a scanner field of view, etc.) or focus drift occurs, an AF imaging system may be unable to determine the OOI. In many scanning applications, it is desirable to keep one or more focus planes constant. VF lenses do not provide any feedback signal indicating a current optical power or focus which can change after initial settings due to ambient temperature variation, aging, and other factors. Further, manual focus control is typically how imaging systems are setup and calibrated. Manual setup can lead to errors due to subjective image analysis of a person performing the calibration, and is also limited to a single plan of inspection at a time. Manual setup is also time consuming and requires training and expertise that may not be readily available. The disclosed system and methods overcome many of the described obstacles by enabling automatic tuning of focus of an imaging system utilizing a VF optical element.

The disclosed system and methods enable the focus tuning of variable focus and autofocus systems for performing scanning in machine vision and barcode applications. The method obtains an image of a focus tuning marker and identifies the focus tuning marker in the obtained image. The system then enters a configuration mode and provides a time delay. The time delay may be constant, or may be variable depending on a condition. The system then executes a focus tuning operation and determines a focus value. A controller then sets the focus of a variable optical element based on the focus value, and the system captures images with the focus set according to the focus value. The disclosed system and methods may be performed during setup of a system for an initial calibration, during barcode scanning, during machine vision operations, or during operation to retune a focus of a system or to change the reference focuses depending on a change of a target, change of distances of targets from the imaging system, or focus drift of one or more optical elements of the system.

Referring now to the drawings, FIG. 1 illustrates an exemplary environment where embodiments of the present invention may be implemented, including the processes described and illustrated herein. In the present example, the environment is provided in the form of a scanning station 100 where goods 102 are moved across or along a scanning surface 104 and are scanned by an imaging reader 106 to identify the goods 102. In some embodiments, the scanning station is a point-of-sale (POS) station, which may have a computer system and an interface, not shown, for optically scanning goods and identifying the goods and characteristics of the goods for affecting a transaction. In some embodiments, the scanning station 100 is part of an inventory delivery system, where goods are conveyed by the scanning surface or across the scanning surface to monitor and control delivery of the goods, for example, shipping goods from a facility or receiving shipped goods to a facility. While the describe system and method may be implemented in a point-of-sale (POS) station, the described technologies would also be beneficial for machine vision applications that scan objects on a conveyer belt at a factory or distribution center, for example.

The scanning surface 104 may be a stationary surface, such that the goods 102 are manually moved relative to the surface 104. In embodiments, the scanning surface 104 may move the goods 102 or be moved by another automated means. In other embodiments, the scanning surface 104 may be a moving surface, such as by a conveyor system such as a conveyer belt, pneumatic conveyer, wheel conveyer, roller conveyer, chain conveyer, flat conveyer, vertical conveyer, trolley conveyer, or another conveyer. In any case, the goods 102 may be moved continuously relative to the imaging reader 106, such that the goods 102 are constantly moving through a working (or scanning) range 108 of the station 100. In some examples, the goods 102 move in a discretized manner, where, at least part of the time the goods 102 are maintained fixed on the surface 104 relative to the imaging reader 106 for a period of time, sufficient to allow one or more images to be captured of the goods 102. In examples, the imaging reader 106 maintains a substantially constant position (e.g., distance and orientation) relative to the scanning surface 104.

The goods 102 may move along different substantially linear paths 110A, 110B, etc. each path traversing the working range 108 but at a different distance from the imaging reader 106. Indeed, the paths 110A, 110B are for illustration purposes, as the goods 102 may traverse across the surface 104 along a single path, or along a plurality of paths at any distance from the imaging reader 106. Optics of the imaging reader 106 must be aligned and properly tuned for the imaging reader 106 to image the goods 102 at distances according to the linear paths 110A and 110B. Typically, imaging readers are manually tuned or aligned which requires a person to either utilize a GUI to control tunable elements, or to manually tune lenses and optics physically by hand using a screwdriver or other tool. The manual tuning of the imaging system 106 is prone to subjective error as optimal focus of the imaging reader 106 is subjectively determined by a person observing obtained images at different focuses. Further, manual tuning the imaging reader 106 is time consuming for a single focus of the imaging reader 106, which compounds for systems requiring a plurality of reference focuses as in the example of FIG. 1 having goods along two paths 110A and 110B. Over time, the focus of optical elements may drift causing one or more of the goods 102 to be out of focus which results in inefficient barcode scanning, or renders the scanning station 100 unable to perform machine vision operations as required.

In some exemplary embodiments, the imaging reader 106 includes a variable focus (VF) imaging system, or an autofocus system in which the reader 106 controls the VF imaging system to set the focus of the imaging system to predetermined reference focuses for scanning an object of interest (OOI) such as the goods 102. The autofocus system may cause the reader 106 to control the VF imaging system to perform a focus tuning operation to determine a focus drift, and to further control the VF imaging system to tune the focus of the system to correct for focus drift. A user may initiate the focus operation during setup of the scanning station or of the imaging reader 106. To initiate the focusing operation, a user may place a focus triggering marker in the field of view of the imaging reader 106, as discussed further herein.

While, in FIG. 1, the imaging reader 106 is depicted as being to the side of the goods 102, in embodiments, the imaging reader 106 may be positioned directly above the goods 102, above the goods 102 in front of or behind the goods 102 configured to image the OOI, or at another position for imaging a region of interest of the goods 102 or any OOI. The imaging reader 106 captures images of goods 102 and may perform machine vision processes at a single plane, or across multiple planes within a range of depths around a focal plane. In such implementations, the goods or objects will appear more in focus at some imaging planes in comparison to others. By capturing images of the goods at only certain imaging planes, i.e. reference planes, or within a range of planes of a focal plane, the imaging reader 106 is able to identify the goods 102 and perform machine vision processes. The imaging reader 106 can be configured such that if it its focal plane is held constant or locked, and images are captured at specific imaging planes irrespective of which scan path the good traverses and without needing to continuously detect the good and autofocus onto the good. This operation greatly reduces power consumption demands on the imaging reader 106. A user may then provide instructions to a controller to initiate a refocus operation, such as by providing a focus tuning marker to the field of view of the imaging reader 106.

The imaging reader 106 requires initial setup before operation, and further, as previously described, electrically tunable AF lenses and systems may undergo focus plane drift due to environmental and other factors, which causes the defocusing of images of OOI reducing the efficacy of the VF imaging reader 106. As discussed further herein, the identification and scanning efficiencies can be increased by performing tuning of the imaging reader 106 using an AF lens or system to determine a focus drift, or a current focus value, and to compensate focus of the imaging reader 106. The described methods may be performed an initial setup of the imaging reader 106, or at any time when tuning or refocusing of the imaging reader may be required for performing machine vision and scanning applications. The disclosed systems and methods increase efficiency, and therefore reduced time required, for reading identifiers on an OOI, e.g., to identify an indicia or other barcode on the good. The methods use a focus tuning marker to cause the system to enter a configuration mode and determine a current focus value from an obtained image of a reference marker. The determined focus value may then be used to determine a compensation value or focus tuning to refocus the imaging reader to a given working distance or focus for performing machine vision and scanning operations. To refocus the system, a controller may control a variable focus optical element to compensate or correct the focus based on the determined focus value.

Figure 2:
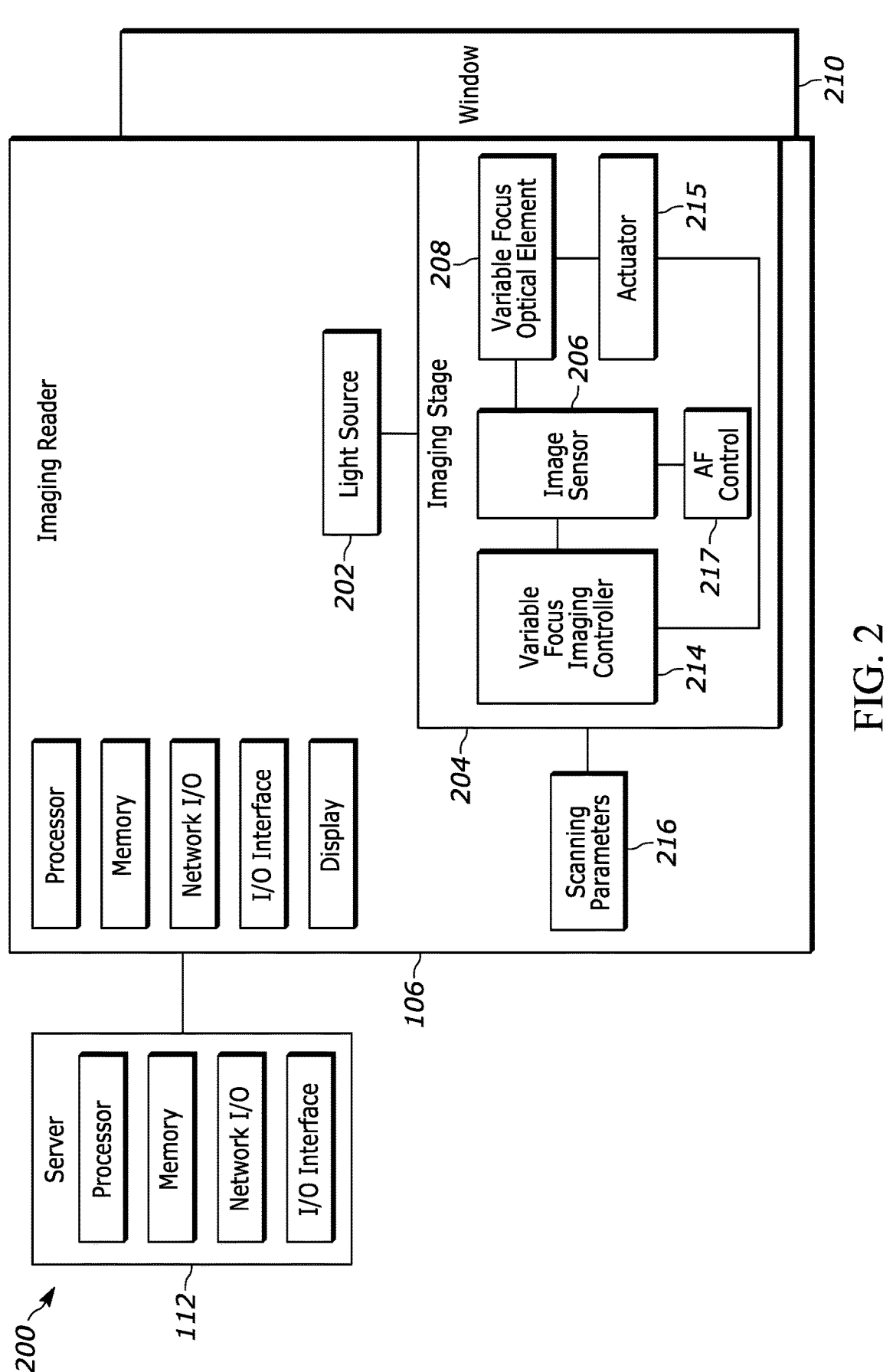
FIG. 2 illustrates a block connection diagram of system including an imaging reader, in accordance with embodiments described herein.

FIG. 2 illustrates a block connection diagram of system 200 including an imaging reader 106. In FIG. 2 the imaging reader 106 may have one or more processors and one or more memories storing computer executable instructions to perform operations associated with the systems and methods as described herein. The imaging reader 106 includes a network input/output (I/O) interface for connecting the reader to the server 112, an inventory management system (not shown), and other imaging readers. These devices may be connected via any suitable communication means, including wired and/or wireless connectivity components that implement one or more communication protocol standards like, for example, TCP/IP, WiFi (802.11b), Bluetooth, Ethernet, or any other suitable communication protocols or standards. The imaging reader 106 further includes a display for providing information such as visual indicators, instructions, data, and images to a user.

In some embodiments, the server 112 (and/or other connected devices) may be located in the same scanning station 100. In other embodiments, server 112 (and/or other connected devices) may be located at a remote location, such as on a cloud-platform or other remote location. In still other embodiments, server 112 (and/or other connected devices) may be formed of a combination of local and cloud-based computers.

Server 112 is configured to execute computer instructions to perform operations associated with the systems and methods as described herein. The server 112 may implement enterprise service software that may include, for example, RESTful (representational state transfer) API services, message queuing service, and event services that may be provided by various platforms or specifications, such as the J2EE specification implemented by any one of the Oracle Weblogic Server platform, the JBoss platform, or the IBM WebSphere platform, etc. Other technologies or platforms, such as Ruby on Rails, Microsoft.NET, or similar may also be used.

In the illustrated example, the imaging reader 106 includes a light source 202, which may be a visible light source (e.g., a LED emitting at 640 nm) or an infrared light source (e.g., emitting at or about 700 nm, 850 nm, or 940 nm, for example), capable of generating an illumination beam that illuminates the working range 108 for imaging over an entire working distance of that working range 108. That is, the light source 202 is configured to illuminate over at least the entire working range 108. The illumination intensity of the light source 202 and the sensitivity of an imaging reader can determine the further and closest distances (defining the distance of the working range, also termed the scanning range) over which a good can be scanned, and a barcode on the good can be decoded. The light source 202 is controlled by processor and may be a continuous light source, an intermittent light source, or a signal-controlled light source, such as a light source trigged by an object detection system coupled (or formed as part of though not shown) to the imaging reader 106. The light source may be an omnidirectional light source.

The imaging reader 106 further includes an imaging arrangement 204 having an imaging sensor 206 positioned to capture images of an illuminated target, such as the goods 102 or another OOI, within the working range 108. In some embodiments, the imaging sensor 206 is formed of one or more CMOS imaging arrays. A variable focusing optical element 208 is positioned between the imaging sensor 206 and a window 210 of the imaging reader 106. A variable focus imaging controller 214 is coupled to the variable focusing optical element 208 and controls the element 208 to define one or more discrete imaging planes for the imaging sensor. The one or more discrete imaging planes may be considered one or more focal planes as described here. The focal plane of the imaging sensor is the imaging plane that is expected to result in the highest efficiency of decoding of indicia and performing machine vision processes, which may depend on an edge sharpness value or another property of an image.

In the illustrated example, the controller 214 is coupled to the variable focusing optical element 208 through an actuator control unit 215 and bypasses an optional autofocus control unit 217. The actuator 215 may include a focusing lens drive, a shift lens drive, a zoom lens drive, an aperture drive, angular velocity drive, voice coil motor drive, and/or other drive units for controlling operation of the optical element 208, which itself may comprise multiple lens, lens stages, etc. While described herein in reference to a variable optical element, the methods for performing focus tuning may be performed with systems that employ a fixed focus lens. In such implementations, a system may provide an indication of a focus value to a user, and the user may manually adjust, or replace, the fixed focus lens to perform focus tuning of the imaging reader.

The VF optical element 208 may be a deformable lens element, a liquid lens, a T-lens, an electrically tunable lens, or another VF optical element. In some embodiments, the optical element includes a voice coil actuator motor in the actuator 215 that is controllably adjusted by the controller 214. In exemplary embodiments, such as some barcode scanning applications, the VF optical element 208 has an aperture from 1 mm to 5 mm. In some embodiments, the image stage 204 is implemented as part of a VF camera assembly.

In exemplary embodiments, the variable focus imaging controller 214 has hands-free mode in which the variable focus optical element 208 and the imaging sensor 206 are controlled to capture an image of a target at a focus imaging plane within the working range in an ordered manner to form a set of captured images of the target, stored in the memory. In implementations, the variable focus optical element 208 and the imaging sensor 206 are controlled to capture a plurality of images of different targets at a single focus imaging plane, and focus values of the system are determined from one or more of the plurality of images.

In some exemplary embodiments, the imaging reader 106 is implemented in a handheld bar code scanner device. When the handheld scanner is placed within a stationary cradle thereby establishing an upright scanning position, the handheld scanner may automatically sense that placement and enter the hands-free mode.

In embodiments, the imaging sensor 112 may be a charge coupled device, or another solid-state imaging device. The imaging sensor 112 may be a one megapixel sensor with pixels of approximately three microns in size. In embodiments, the imaging sensor 112 includes a sensor having an active area of 3 millimeters, 4.5 millimeters, 5 millimeters, 6.8 millimeters, 7.13 millimeters, less than 5 millimeters, less than 10 millimeters, or less than 50 millimeters. The imaging sensor 112 may have a total of about 1 megapixels, 2 megapixels, 2.3 megapixels, 5 megapixels, 5.1 megapixels or more than 5 megapixels. Further, the imaging sensor 112 may include sensors with pixels having dimensions of less than 10 microns, less than 5 microns, less than 3 microns, or less than 2 microns in size in at least one dimension of the pixel. In embodiments, the lens assembly is configured to capture images with a modulation transfer function of 40% at 160 line pairs per millimeter.

Figure 3:
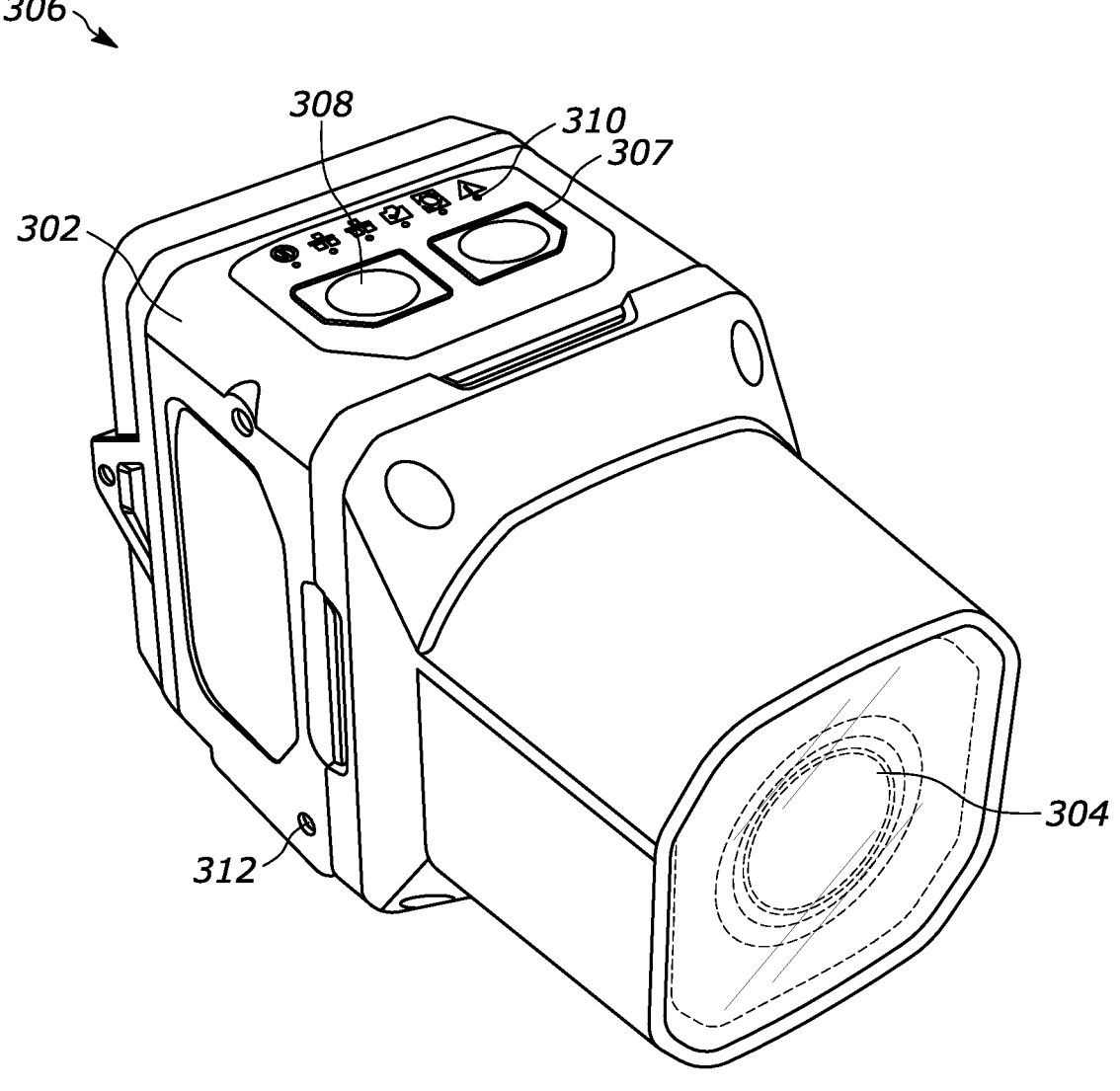
FIG. 3 is a perspective view of an example machine vision device for performing the disclosed methods, in accordance with embodiments described herein.

FIG. 3 is a perspective view of an example machine vision device 306 that may be implemented as the imaging reader 106 of FIGS. 1 and 2, in accordance with embodiments described herein. The machine vision device 306 includes a housing 302, an imaging aperture 304, a user interface label 307, a dome switch/button 308, one or more light emitting diodes (LEDs) 310, and mounting point(s) 312. In examples, the machine vision device 306 may include or otherwise be adaptable to include, for example but without limitation, one or more bandpass filters, one or more polarizers, one or more waveplates, one or more DPM diffusers, one or more C-mount lenses, and/or one or more C-mount liquid lenses over or otherwise influencing the focal distance of the machine vision device 306.

Figure 5:
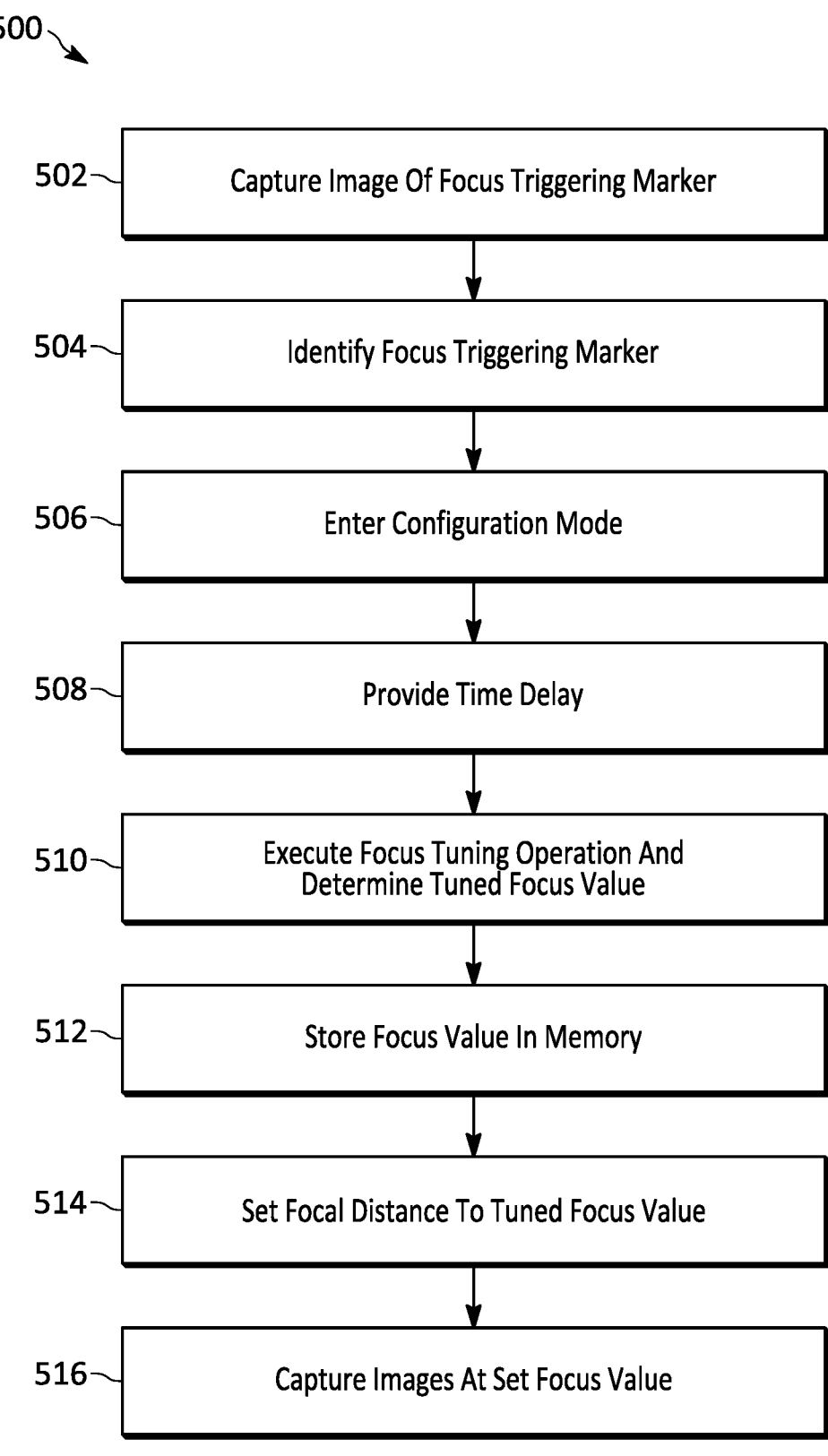
FIG. 5 is a flowchart representative of a method for performing focus tuning of an imaging system, in accordance with embodiments described herein.

As further described in reference to the method 500 of FIG. 5, the machine vision device 306 may be controlled to perform focus tuning initiated by a user by providing a focus tuning marker to the field of view of the machine vision device 306. Once the focus tuning marker is identified by a processor, the machine vision device 306 may access enter a configuration mode and access machine-executable instructions and retrieve a job file to perform the focus tuning operations described herein. For example, a job file may include instructions for the variable focus imaging controller 214 to control the actuator to fix or lock a focal distance of the variable focus optical element, and further for the image sensor 206 to capture a plurality of images at the fixed focal distance. The job file may further include one or more image metrics for filtering a plurality of images to generate a set of reference images. The job file may further instruct a processor to determine a focus value for each image of the plurality of images or the set of reference images. The job file may then cause the processor to store data indicative of the focus value in a memory, such as the memory of the imaging reader 106, or of the server 112, or of another memory. The job file may further cause a processor to determine a focus compensation value from the determined focus value, and the job file may cause the variable focus imaging controller 214 to control the actuator 215 to tune the focal distance of the variable focus optical element 208 according to the focus compensation value.

The user interface label 307 may include the dome switch/button 308 and one or more LEDs 310, and may thereby enable a variety of interactive and/or indicative features. Generally, the user interface label 307 may enable a user to trigger and/or tune to the machine vision device 306 (e.g., via the dome switch/button 308) and to recognize when one or more functions, errors, and/or other actions have been performed or taken place with respect to the machine vision device 306 (e.g., via the one or more LEDs 310). For example, the trigger function of a dome switch/button (e.g., dome/switch button 308) may enable a user to capture an image using the machine vision device 306 and/or to display a trigger configuration screen of a user application via a monitor or visual display. The trigger configuration screen may allow the user to configure one or more triggers for the machine vision device 306 that may be stored in memory for use in later developed machine vision jobs, as discussed herein.

The mounting point(s) 312 may enable a user connecting and/or removably affixing the machine vision device 306 to a mounting device (e.g., imaging tripod, camera mount, etc.), a structural surface (e.g., a warehouse wall, a warehouse ceiling, scanning bed or table, structural support beam, etc.), other accessory items, and/or any other suitable connecting devices, structures, or surfaces. For example, the machine vision device 306 may be optimally placed on a mounting device in a distribution center, manufacturing plant, warehouse, and/or other facility to image and thereby monitor the quality/consistency of products, packages, and/or other items as they pass through a field of view of the machine vision device 306. Moreover, the mounting point(s) 312 may enable a user to connect the machine vision device 306 to a myriad of accessory items including, but without limitation, one or more external illumination devices, one or more mounting devices/brackets, and the like.

In addition, the machine vision device 306 may include several hardware components contained within the housing 302 that enable connectivity to a computer network (e.g., network 112 of FIG. 2). For example, the machine vision device 306 may include a networking interface that enables the machine vision device 306 to connect to the network (i.e., the network 112 of FIG. 2), such as a Gigabit Ethernet connection and/or a Dual Gigabit Ethernet connection. Further, the machine vision device 306 may include transceivers and/or other communication components as part of the networking interface to communicate with other devices via, for example, Ethernet/IP, PROFINET, Modbus TCP, CC-Link, USB 3.0, RS-232, and/or any other suitable communication protocol or combinations thereof.

Figure 4A:
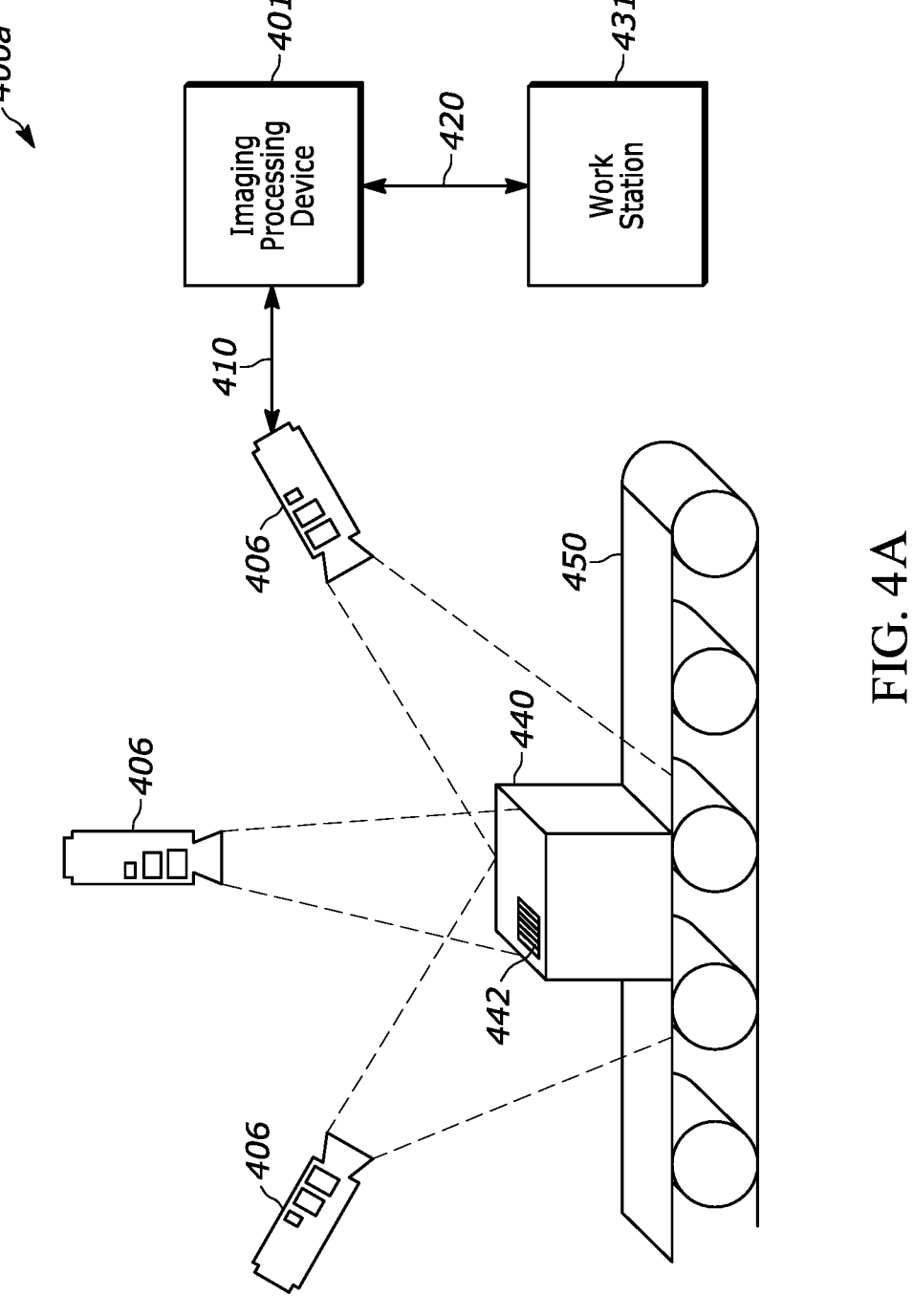
FIG. 4A illustrates an example environment for implementing the methods and systems described herein.
Figure 4B:
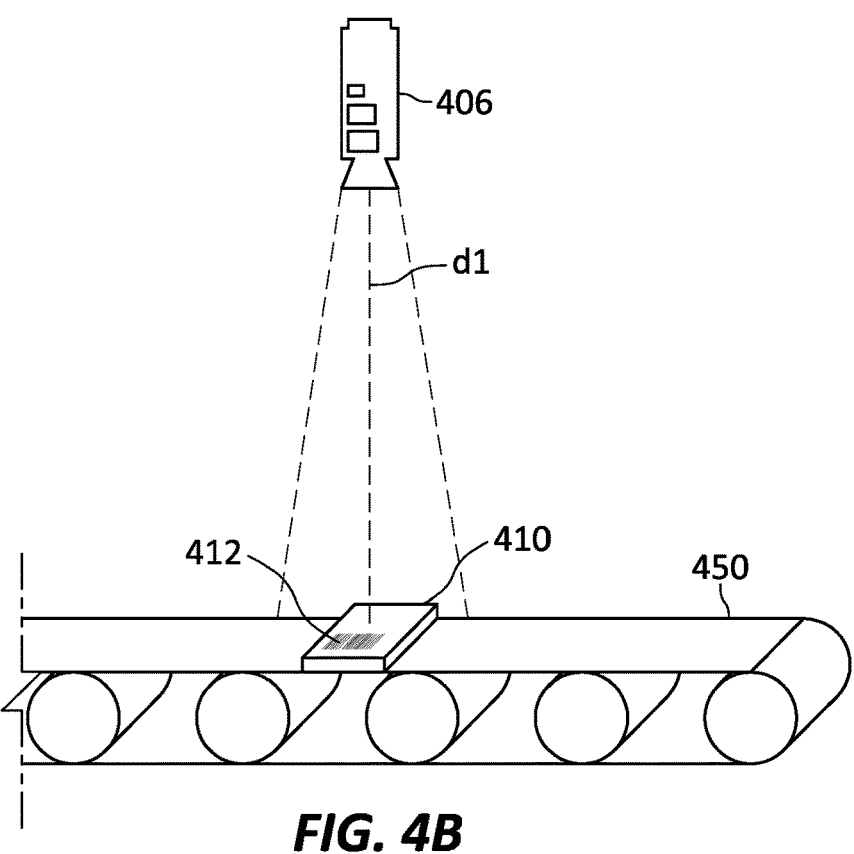
FIG. 4B illustrates an example environment with a focus triggering element in a field of view of an imaging reader, in accordance with embodiments described herein.
Figure 4C:
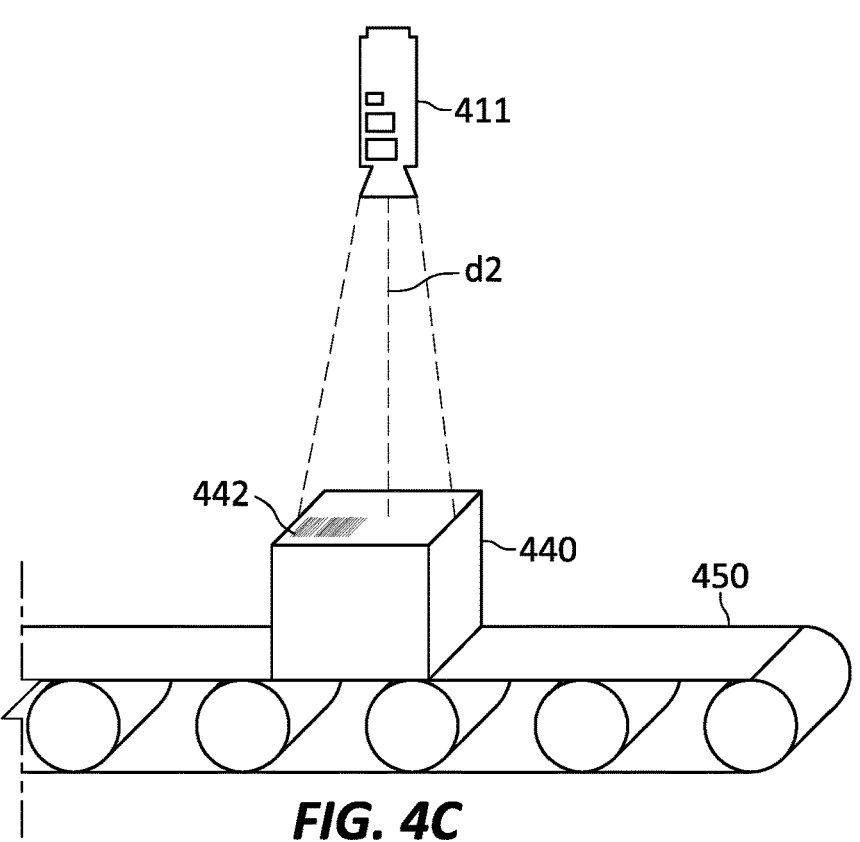
FIG. 4C illustrates an example environment with a target object in a field of view of an imaging reader for performing focus tuning, in accordance with embodiments described herein.

FIGS. 4A, 4B, and 4C illustrate example environments 400*a*, 400*b*, and 400*c*, respectfully, for the implementation of the methods and systems described herein. The example environments 400*a*, 400*b*, and 400*c* may one or more imaging devices 406 (e.g., the imaging reader 106 of FIGS. 1 and 2, or machine vision device 306 of FIG. 3), a work station 431, an imaging processing device 401, an object 440, and/or a conveyor assembly 250. In examples, image processing performed by the image processing device 401 may be performed by the imaging devices 411, as described with reference to the imaging readers 106 and 306 of respective FIGS. 2 and 3. In other embodiments, the image processing may be performed external to the imaging devices 411, as shown in FIGS. 4A-4C.

In operation, an object 440 may be moved across the conveyor assembly 450. The one or more imaging devices 406 may capture image data of the object 440 (e.g., via the one or more image sensors 206 of the imaging reader 106) as the object 449 moves past the one or more imaging devices 406 along the conveyor assembly 450.

In some embodiments, the object may trigger a sensor, not shown (e.g., a motion sensor, a proximity sensor, lidar, etc.). In some embodiments, the sensor may directly cause the one or more imaging devices 406 to capture the image data of the object 440. Alternatively, in some embodiments, the sensor may transmit a triggering signal to the imaging processing device 401 which may in turn send a capturing signal to the one or more imaging devices 406. In embodiments where two or more imaging devices 406 are used, the imaging processing device 401 may transmit a capturing signal instructing the two or more imaging devices 406 to capture the image data at about the same point in time. Once the one or more imaging devices 406 have captured the image data, the one or more imaging devices 406 may transmit the image data to the imaging processing device 401.

Alternatively, in some embodiments, the one or more image devices 406 may continuously capture image data. In these embodiments, the one or more image devices 406 may continuously transmit the image data to the imaging processing device 401. Upon receiving the image data, the one or more image devices 406 may select one or more frames from the image data (e.g., by using one or more image processing algorithms or techniques to determine that the object 440 is in a frame of the image data).

In some embodiments, once the imaging processing device 401 receives the image data and/or selects the one or more frames of the image data, the imaging processing device 401 may determine one or more candidate positions of an indicia 442, or a reference element, on the object 440 (e.g., via one or more image processing algorithms and/or techniques). The multiple perspectives may overlap (as illustrated in FIG. 2A) which allow for the imaging processing device 401 to determine a general location across the image data. In the example provided in FIG. 4A, the imaging processing device 401 would determine the candidate position of the indicia 442 as being somewhere in the top portion of the object 440. The imaging processing device 401 may then determine a region of interest in images for searching for and identifying the indicia 442 in the captured images. In implementations, the region of interest may be provided by a user, such as via a user interface of the workstation 431, or retrieved from a memory or server. In some embodiments, the imaging processing device 401 may determine one or more candidate positions of a reference element or point of interest of the object 440. The reference element may be an identifying and/or defining structure, feature, and/or other aspect of the object 240 such as a corner, a graphic, an alphanumeric, a barcode, etc. In examples, the reference element may be a decodable indicia that causes the system to enter a configuration mode and perform focus tuning operations as described herein. Additional reference markers may be provided to the imaging device 406 to identify a focus value from one or more images obtained by the imaging device 406.

The image processing device 401 may identify the reference element in one or more images of a plurality of images captured by the imaging devices 406. The image processing device 401, or another processor, may then identify a focus triggering marker that causes the system to enter a configuration mode, provide a time delay, and execute, after providing the time delay, focusing operations. The focusing operation may include the image processing device determining a focus value from one or more images captured by the imaging device 406. The image processing device 401 may then store the focus value in a memory, or may further cause a controller to tune or adjust a focus of the one or more imaging devices 406 based on the focus value.

The work station 431 may be a general computing device (such as a desktop computing device, a laptop computer, a tablet, a mobile device, a smartphone or other smart device, a wearable device, smart contacts, smart glasses, headsets, etc.). In some embodiments, there may be a plurality of imaging processing devices 401, imaging devices 406, capturing and/or processing image data across multiple conveyor assemblies 450 in parallel. In these embodiments, the work station 431 may act as a central hub designated to receive and/or process the plurality of image data, indicia 442, and/or identifying data of object(s) 440.

FIGS. 4B and 4C illustrate implementations that utilize a single imaging device 406, with the image processing performed in the single housing of the imaging device 106, as illustrated with respect to the imaging readers 106 and 306 of FIGS. 1 and 3 respectively. FIG. 5 illustrates a method 500 of performing focus tuning for an imaging reader. In the description of the method 500 of FIG. 5, the imaging devices 406 of FIGS. 4B and 4C are considered to have a substantially constant distance between the imaging devices 406 and an imaging surface such as the conveyer assembly 450. Therefore, distances between the imaging device 406 and objects on the imaging surface (i.e., conveyer assembly) may be determined or known based on the substantially fixed distance between the imaging device 406 and the conveyer assembly 450. "Substantially fixed" may be interpreted to be within 10% of a given distance, within 15% of a given distance, or within 20% of a given distance. The method 500 may be implemented by the imaging readers 106, 306, and 406 of any of FIGS. 1-4C, for example. For clarity and simplicity, the method 500 will be described with combine reference to components of FIGS. 1, 2, 4B, and 4C. In the illustrated embodiments, the imaging scanner is part of a scanning station of an inventory system, where goods are conveyed by the scanning surface or across the scanning surface to monitor and control delivery of the goods, for example, shipping goods from a facility or receiving shipped goods to a facility, as illustrated in FIGS. 1, 4B, and 4C. The methods described herein may be implemented in an inspection station where on OOI moves into a field of view of an imaging reader, the OOI pauses momentarily in the field of view to be imaged, and then the OOI moves out of the field of view, or the OOI may proceed through the field of view without stopping.

The imaging reader 106 of a variable optical imaging assembly captures a first image of a field of view of the imaging reader at block 502. The first image includes an image of a trigger target 410 with a focus triggering marker 412 thereon, illustrated in FIG. 4B, disposed in the field of view of the imaging reader 106. The focus triggering marker 412 is at a first distance d1 from the imaging reader 106. The first distance d1 may be dependent on a working distance range of the imaging reader 106.

A processor identifies the focus triggering marker 412 in the first image at block 504. The focus triggering marker 412 may include one or more of a 1D barcode, 2D barcode, static QR code, dynamic QR code, UPC code, a predefined custom pattern, alphanumeric identifier, decodable indicia, fiducial marker or object, an image feature a physical feature of an object, or another marker that may be identified by the processor in an image. The processor may identify the focus triggering marker by performing image processing, or a machine vision process, of the first image. Responsive to identifying the focus triggering element 412, the processor causes the variable focusing imaging assembly to enter into a configuration mode at block 506.

Once in the configuration mode, the system provides a time delay and waits to perform further actions and processes at block 508. The time delay may be a fixed time delay that is preset by a user, or stored in a memory. The time delay may be a variable time delay that depends on additional actions, feedback, or conditions. In the configuration mode, the imaging system may wait to initiate a time delay based on a condition. In once such example, the system may be configured to monitor for motion in the field of view of the imaging reader 106. The imaging reader 106 may detect motion in the field of view of the imaging sensor, and at a later time, the system may determine that there is no more motion in the field of view of the imaging reader. The system may then begin the time delay, or pass the time delay, once it has determined that there is no more motion in the field of view of the imaging reader 106. In other examples, the time delay itself may be dependent on motion in the field of view of the imaging reader 106. In one such example, once in the configuration mode, the processor causes the system to monitor and detect motion in the field of view of the imaging reader 106. The system continues to monitor the field of view for motion, and the system extends the time delay until motion is no longer detected in the field of view of the imaging read 106. This is one example of a variable time delay that is dependent on an environmental condition, and specifically, motion in the field of view of the imaging reader 106. In examples, the time delay may have maximum length, or a timeout point, at which when the timeout point is reached, the system continues with further focus tuning operations even if a given condition is not met (e.g., there is still motion detected in the field of view of the imaging reader 106). In additional implementations, the processor may monitor the field of view of the imaging device 406 to identify removal of the focus triggering marker 412 from the field of view of the imaging device 406. The processor may then determine that the focus triggering marker 412 has been removed, and once it is determined that the focus triggering marker 412 has been removed from the field of view of the imaging device 406, the system may execute further operations, such as the focusing operation described below. In examples, the system may provide the time delay after it has been determined that the focus triggering marker 412 has been removed from the field of view of the imaging device 406.

Subsequent to the passing of the time delay, the processor executes a focusing operation to focus a focal distance of the imaging assembly 106 at block 510. To perform the focusing operation, the system determines a focus value based on one or more images captured (i) in the configuration mode, and (ii) after the time delay. Performing the focus operation and determining the focus value may include capturing, by the imaging sensor, a target object in a second image of the field of view of the imaging reader 106, for example, such as the object 240 of FIG. 4C. The second object may be at a second distance d2 from the imaging reader 106. The second distance may be a predetermined distance for determining the focus value. In implementations, the distance between the imaging reader The method 500 may then further include determining the focus values from one or more features associated with the target of the second image. For example, the focus value may be determined from a reference element including one or more of a 1D barcode, 2D barcode, static QR code, dynamic QR code, UPC code, a predefined custom pattern, alphanumeric identifier, a feature having a spatial frequency content of greater than of greater than a 2 mil barcode or 2 pixels per module, or an element with a plurality of different sized features at different focuses of the imaging system. The focus value may be determined from a predetermined part of an object such as a surface, corner, or other feature on an object or target in the field of view of the imaging reader 106. In some examples, the focus value may be determined from a text, one or more electrical traces on a circuit board, one or more electrical components (e.g., resistors, chips, transistors, etc.), grids on a surface, a pattern on a surface, predefined fiducial markers, or an outline of an object of interest in the field of view of the imaging reader 106. In examples, the focus value may be determined from a reference element disposed in a fixed position relative to the imaging reader 106, such that the reference element is always visible to the imaging reader 106, or such that the reference element is visible to the imaging reader when not obstructed by an object in the field of view of the imaging reader 106. In other examples, the reference element may be selectively removable from the field of view of the imaging reader 106. For example, an object having the reference element may be placed in the field of view of the imaging reader to perform the focus tuning described herein, and the reference element may then be removed from the field of view to perform scans and machine vision operations on objects.

To determine the focus value, the processor may determine an image metric value for one or more images and determine the focus value based on the image metric. In examples, the processor may further filter images based on the determined image metric values to generate a set of filtered images to determine the focus value from. In examples, the processors may determine one or more image metric values for each of the images of the set of reference images. The image metric may include a property or characteristic of the images such as a sharpness value, a contrast value, a normalized sharpness, an image resolution, a spatial frequency content value, a noise measurement value, a dynamic range value, a measurement of image distortion, a blur value, a pixels per module value, a modulation transfer function, or another value associated with an image or image quality. For example, the set of images may be filtered into a set of filtered images that have an image sharpness value greater than a given threshold, or with a PPM value within a certain range of values. In examples, the processor may use a combination or weighted combination of image properties, image characteristics, or image metric values for filtering the set of reference image, or to determine focus values. Filtering the set of reference images may reduce the overall noise of determined focus values which may cause errors or result in inaccurate focus. At block 512, the one or more processors then stores data indicative of the focus value in a memory.

A controller, such as the variable focus imaging controller 214, then sets a focal distance of a tunable optical element, such as the variable focus optical element 208, according to the determined focus value at block 514. For example, the controller may apply a voltage to a liquid lens to tune the focal length of the lens to adjust the focal distance of the imaging reader 106 into a desired focal distance range. In any examples, the tunable optical element may include one or more liquid lenses, electrically tunable lenses, mechanically translatable lenses, or another element that a controller may interact with, electrically or mechanically, to control the focal distance of the imaging reader 106. Then the imaging reader 106 captures one or more images with the focal distance of the tunable optical element set to the focus value at block 516.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Alternative implementations of the examples represented by the block diagram of the system 200 of FIG. 2 includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for setting a focus parameter of a variable focus imaging assembly, the method comprising:
capturing, by an imaging sensor of the variable focusing imaging assembly, a first image of a focus triggering marker positioned at a first distance within a field of view of the imaging sensor;
identifying, by a processor of the variable focusing imaging assembly, the focus triggering marker in the first image;

responsive to identifying the focus triggering marker in the first image, entering the variable focusing imaging assembly into the configuration mode and providing a time delay;
executing, subsequent to the passing of the time delay, a focusing operation to focus the imaging assembly including determining a focus value based on one or more images captured in the configuration mode and after the time delay;
setting, via a controller configured to control a focal distance of a tunable optical element of the imaging assembly, the focal distance of the tunable optical element according to the focus value; and
capturing, by the imaging sensor, one or more images with the focal distance of the tunable optical element set to the focus value.

2. The method of claim 1, wherein determining the focus value based on one or more images captured in the configuration mode and after the time delay comprises:
capturing, by the imaging sensor, an image of a target object within the field of view of the imaging sensor; and
determining, by the processor, the focus value from one or more features associated with the target object of the second image.

3. The method of claim 1, further comprising storing the focus value in a memory.

4. The method of claim 1, wherein the variable focus imaging assembly has a substantially fixed distance between the imaging assembly and an imaging surface.

5. The method of claim 1, wherein the time delay is a fixed time delay.

6. The method of claim 1, further comprising detecting motion in the field of view of the imaging sensor, and subsequently determining that there is no more motion in the field of view of the imaging sensor before passing the time delay.

7. The method of claim 1, further comprising detecting motion in the field of view of the imaging sensor and extending the time delay until motion is no longer detected in the field of view of the imaging sensor or until a timeout point is reached.

8. The method of claim 1, wherein the focus triggering marker comprises at least one of a barcode, decodable indicia, a fiducial marker or object, an image feature, or a physical feature of an object.

9. A method for setting a focus parameter of a variable focus imaging assembly, the method comprising:
capturing, by an imaging sensor of the variable focus assembly, a first image of a focus triggering marker positioned at a first distance within a field of view of the imaging sensor;
identifying, by a processor of the variable focusing imaging assembly, the focus triggering marker in the first image;
responsive to identifying the focus triggering marker in the first image, entering the variable focusing imaging assembly into a configuration mode;
monitoring, by the imaging assembly and after entering the configuration mode, the field of view to identify a removal of the focus triggering marker from the field of view of the imaging sensor;
determining, by a processor, that the focus triggering marker has been removed from the field of view of the imaging sensor;
executing, subsequent to removal of the focus triggering marker, a focusing operation to focus the imaging assembly including determining a focus value based on one or more images captured in the configuration mode and after the focus triggering marker has been removed from the field of view of the imaging sensor;

setting, via a controller configured to control a focal distance of a tunable optical element of the imaging assembly, the focal distance of the tunable optical element according to the focus value; and capturing, by the imaging sensor, one or more images with the focal distance of the tunable optical element set to the focus value.

10. The method of claim 9, further comprising detecting motion in the field of view of the imaging sensor, and waiting to execute the focusing operation until motion is not detected in the field of view.

11. The method of claim 9, further comprising locking, via the, the focal distance of the variable focus imaging assembly based on the focus value.

12. A focus parameter tuning variable focus imaging system comprising:

a tunable optical element;

a controller in communication with the tunable optical element, the controller configured to control a focal distance of the tunable optical element;

an imaging sensor configured to capture images of a field of view of the imaging sensor; and a processor and computer-readable media storage having machine readable instructions stored thereon that, when the machine readable instructions are executed, cause the imaging system to:

capture, by the imaging sensor, a first image of a focus triggering marker positioned at a first distance within a field of view of the imaging sensor;

identify, by the processor, the focus triggering marker in the first image;

enter, upon identification of the focus triggering element, the variable focusing imaging assembly into a configuration mode and providing a time delay;

execute, subsequent to the passing of the time delay, a focusing operation to focus the imaging assembly including determining a focus value based on one or more images captured in the configuration mode and after the time delay;

set, via the controller, the focal distance of the tunable optical element according to the focus value; and capture, by the imaging sensor, one or more images with the focal distance of the tunable optical element set to the focus value.

13. The system of claim 12, wherein to determine the focus value based on one or more images captured in the configuration mode and after the time delay, the machine readable instructions cause the system to:

capture, by the imaging sensor, an image of a target object within the field of view of the imaging sensor; and determine, by the processor, the focus value from one or more features associated with the target object of the second image.

14. The system of claim 12, wherein the machine readable instructions further cause the system to comprising detect motion in the field of view of the imaging sensor, and subsequently determine that there is no more motion in the field of view of the imaging sensor before passing the time delay.

15. The system of claim 12, wherein the machine readable instructions further cause the system to detect motion in the field of view of the imaging sensor and extend the time delay until motion is no longer detected in the field of view of the imaging sensor or until a timeout point is reached.

16. A focus parameter tuning variable focus imaging system comprising:

a tunable optical element;

a controller in communication with the tunable optical element, the controller configured to control a focus of the tunable optical element;

an imaging sensor configured to capture images of a field of view of the imaging sensor; and a processor and computer-readable media storage having machine readable instructions stored thereon that, when the machine readable instructions are executed, cause the imaging system to:

capture, by the imaging sensor, a first image of a focus triggering marker positioned at a first distance within a field of view of the imaging sensor;

identify, by the processor, the focus triggering marker in the first image;

enter, upon identification of the focus triggering marker, the variable focusing imaging assembly into a configuration mode;

monitor, by the imaging assembly and after entering the configuration mode, the field of view to identify a removal of the focus triggering marker from the field of view of the imaging sensor;

determine, by the processor, that the focus triggering marker has been removed from the field of view of the imaging sensor;

execute, subsequent to removal of the focus triggering marker, a focusing operation to focus the imaging assembly including determining a focus value based on one or more images captured in the configuration mode and after the focus triggering marker has been removed from the field of view of the imaging sensor;

set, via the controller, the focal distance of the tunable optical element according to the focus value; and capture, by the imaging sensor, one or more images with the focal distance of the tunable optical element set to the focus value.

17. The system of claim 16, wherein the machine readable instructions further cause the system to provide a time delay after determining that the focus triggering marker has been removed from the field of view.

18. The system of claim 16, wherein the machine readable instructions further cause the system to detect motion in the field of view of the imaging sensor, and wherein the time delay is dependent on detecting the motion in the field of view of the imaging sensor.

\* \* \* \* \*